United States Patent
Tyrell et al.

[11] Patent Number: 5,262,493
[45] Date of Patent: Nov. 16, 1993

[54] BLOW-MOLDABLE COPOLYETHENIMIDE KISTER COMPOSITIONS SALTS OF ALIPHATIC POLYCARBOXYLIC ACID

[75] Inventors: John A. Tyrell, Dalton, Mass.; S. Jack Willey, Chatham, N.Y.

[73] Assignee: General Electric Company, Pittsfield, Mass.

[21] Appl. No.: 546,138

[22] Filed: Jun. 29, 1990

[51] Int. Cl.$^5$ .............................................. C08L 79/08
[52] U.S. Cl. .................... 525/434; 525/420; 525/436; 525/423; 524/394
[58] Field of Search ................ 525/420, 436, 434; 524/394

[56] References Cited

U.S. PATENT DOCUMENTS

| | | | |
|---|---|---|---|
| 3,023,192 | 2/1962 | Shivers, Jr. | 260/75 |
| 3,516,957 | 6/1970 | Gray et al. | 260/22 |
| 3,651,014 | 5/1972 | Witsiepe | 260/75 R |
| 3,761,450 | 9/1973 | Herwig et al. | 260/75 R |
| 3,763,109 | 10/1973 | Witsiepe | 260/75 R |
| 3,766,146 | 10/1973 | Witsiepe | 260/75 R |
| 3,957,706 | 5/1976 | Light et al. | 260/22 R |
| 4,010,222 | 1/1977 | Shih | 260/873 |
| 4,205,158 | 5/1980 | Hoeschele | 528/300 |
| 4,229,332 | 10/1980 | Kyo et al. | 260/22 T |
| 4,362,836 | 10/1980 | Hoeschele | 524/322 |
| 4,371,692 | 2/1983 | Wolfe, Jr. | 528/289 |
| 4,559,164 | 12/1985 | Kostelnik et al. | 252/511 |
| 4,711,933 | 12/1987 | McCready et al. | 525/415 |
| 4,714,754 | 12/1987 | McCready et al. | 528/288 |
| 4,891,397 | 1/1990 | Liu | 524/141 |

FOREIGN PATENT DOCUMENTS

| | | |
|---|---|---|
| 0021648 | 1/1981 | European Pat. Off. . |
| 48-25066 | 7/1973 | Japan . |
| 53-10674 | 9/1978 | Japan . |
| 53-106750 | 9/1978 | Japan . |
| 53-143449 | 12/1978 | Japan . |
| 53-144954 | 12/1978 | Japan . |
| 53-3144955 | 12/1978 | Japan . |

*Primary Examiner*—Ana L. Carrillo

[57] ABSTRACT

Blow moldable copolyetherimide ester compositions are provided. The copolyetherimide ester compositions contain respective amounts of copolyetherimide ester resin and salts of aliphatic polycarboxylic acid. Preferably amounts of multifunctional epoxide are also incorporated into the compositions for further increasing the melt strength thereof. The compositions exhibit suitable melt strength for blow molding thereof.

6 Claims, No Drawings

BLOW-MOLDABLE COPOLYETHENIMIDE KISTER COMPOSITIONS SALTS OF ALIPHATIC POLYCARBOXYLIC ACID

BACKGROUND OF THE INVENTION

1. Field of the Invention

The present invention relates to copolyetherimide ester compositions and more particularly relates to blow moldable copolyetherimide ester compositions.

Description of Related Art

Various polyetherimide ester polymers are known and are described in McCready, U.S. Pat. Nos. 4,544,734 and 4,556,705 and McCready et al., U.S. Pat. No. 4,556,688. These polyetherimide esters have, however, lacked the melt strength required to make them suitable for blow molding thereof.

Salts of aliphatic polycarboxylic acids have been set forth as melt strength modifiers for copolyester and copolyether ester elastomer compositions for improved blow moldability (See Hoeschele, U.S. Pat. No. 4,362,836). This reference, however, does not disclose copolyetherimide ester compositions exhibiting suitable blow molding characteristics.

Accordingly, one object of the present invention is to provide a blow moldable copolyetherimide ester composition.

SUMMARY OF THE INVENTION

The present invention involves blow moldable copolyetherimide ester compositions which have respective amounts of copolyetheresterimide resin and salts of aliphatic polycarboxylic acid and optionally a multifunctional expoxide. The compositions exhibit enhanced levels of melt strength and elasticity.

DETAILED DESCRIPTION OF THE INVENTION

The polyetherimide ester polymers of the present invention are well known elastomers and are described in U.S. Pat. Nos. 4,544,734 and 4,566,705 to McCready and in U.S. Pat. No. 4,566,688 to McCready et al., and U.S. Pat. Nos. 4,711,933 and 4,714,754, all of which are incorporated herein by reference.

These polyetherimide esters are comprised of the reaction products of:
 (i) at least one diol;
 (ii) at least one dicarboxylic acid or its ester forming reactive derivative; and
 (iii) a set of reactants selected from:
  (a)(1) at least one high molecular weight poly(oxyalkylene)diamine, and
  (a)(2) at least one tricarboxylic acid or its derivative, or
  (b) at least one high molecular weight polyoxyalkylene diimide diacid.

Suitable diols (i) for use in the preparation of the polyetherimide ester polymers of the present invention include the saturated and unsaturated aliphatic and cycloaliphatic dihydroxy compounds as well as the aromatic dihydroxy compounds. These diols are preferably of a low molecular weight, i.e., having a molecular weight of about 250 or less. When used herein, the term 'diol' and 'low molecular weight diol' should be construed to include equivalent ester forming derivatives thereof provided, however, that the aforementioned molecular weight requirement pertains to the diols only and not to their ester forming derivatives. Exemplary of ester forming derivatives of diols there may be given the acetates of the diols as well as, for example, ethylene oxide or ethylene carbonate for ethylene glycol.

The preferred saturated and unsaturated aliphatic and cycloaliphatic diols are those having from 2 to about 15 carbon atoms. Exemplary of these there may be given ethylene glycol, propanediol, butanediol, pentanediol, 2-methyl propanediol, 2,2-dimethyl propanediol, hexanediol, decanediol, 1,2-, 1,3- and 1,4- cyclohexane dimethanol, butenediol, hexenediol, etc. Especially preferred are 1,4-butanediol and mixtures thereof with hexanediol, 1,4-cyclohexane dimethanol, or butenediol, most preferably 1,4-butanediol.

Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'-dihydroxy naphthalene, 4,4'-dihydroxy diphenyl, bis(p-hydroxy phenyl)methane and bis(p-hydroxy phenyl)methane and bis(p-hydroxy phenyl)-2,2-propane.

Especially preferred diols are the saturated aliphatic diols, mixtures thereof, and mixtures of a saturated diol(s) with an unsaturated diol(s), wherein each diol contains from 2 to about 8 carbon atoms. Where more than one diol is employed, it is generally preferred that at least about 60 mole %, based on the total diol content, be the same diol, more preferably at least 80 mole %. As mentioned above, the preferred compositions are those in which 1,4-butanediol is present in a predominant amount, most preferably when 1,4-butanediol is the only diol.

Dicarboxylic acids (ii) which are suitable for use in the practice of the present invention are aliphatic, cycloaliphatic, and/or aromatic dicarboxylic acids. These acids are preferably of a low molecular weight, i.e., having a molecular weight of less than about 300. However, in some cases higher molecular weight dicarboxylic acids may be used. The term 'dicarboxylic acids' as used herein, includes equivalents of dicarboxylic acids having two functional carboxyl groups which perform substantially like dicarboxylic acids in reaction with glycols and diols in forming polyesters. These equivalents include esters and ester-forming reactive derivatives, such as acid halides and anhydrides. The molecular weight preference mentioned above pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids may contain any substituent group(s) or combinations which do not substantially interfere with the polymer formation and use of the polymer of this invention.

Aliphatic dicarboxylic acids, as the term is used herein, refer to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals such as —O— or —SO$_2$—.

Representative aliphatic and cycloaliphatic acids which can be used for this invention are sebacic acid, b 1,2-cyclohexane dicarboxylic acid, 1,3-cyclohexane dicarboxylic acid, adipic acid, glutaric acid, succinic acid, oxalic acid, dimer acid, 4-cyclohexene-1,2-dicarboxylic acid, 2-ethysuberic acid, tetramethylsuccinic acid, cyclopentanedicarboxylic acid, decahydro-1,5 naphthalene dicarboxylic acid, 4,4'-bicyclohexyl dicarboxylic acid, decahydro-2,6 naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, oxybis(benzoic acid), ethylene-1,2-bis(p-oxybenzoic acid, 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$–$C_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids those with 8–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % of dicarboxylic acid (ii) be the same dicarboxylic acid or ester derivative thereof. As mentioned above, the preferred compositions are those in which dimethylterephthalate is the predominant dicarboxylic acid, most preferably when dimethylterephthalate is the only dicarboxylic acid.

The polyetherimide ester polymers of the present invention may be prepared by a one-pot synthesis involving the reaction of the diol (i), the dicarboxylic acid (ii), the high molecular weight poly(oxy alkylene)diamine (iii)(a)(1), and the tricarboxylic acid or its derivative (iii)(a)(2). In such a synthesis the polyoxyalkylene diimide diacid (iii)(b) is formed in-situ by the reaction of the poly(oxy alkylene)diamine with the tricarboxylic acid.

The poly(oxy alkylene)diamines (iii)(a)(1) suitable for use in the present invention may be represented by the following general formula:

$$H_2N—G—NH_2 \qquad (I)$$

wherein G is the radical remaining after the removal of the amino groups of a long chain alkylene ether diamine. These polyether diprimary diamines are available commercially from a Texaco Chemical Company under the trademark JEFFAMINE. In general they are prepared by known processes for the amination of glycols. For example, they may be prepared by aminating the glycol in the presence of ammonia, Raney nickel catalyst and hydrogen as set forth in Belgium Patent No. 634,741. Alternately, they may be prepared by treating glycol with ammonia and hydrogen over a Nickel-Copper-Chromium catalyst as taught by U.S. Pat. No. 3,654,370. Other methods for the production thereof include those taught by U.S. Pat. Nos. 3,155,728 and 3,236,895 and French Patent Nos. 1,551,605 and 1,466,708, all of the foregoing patents are incorporated herein by reference.

The long chain ether diamines suitable for use herein are the polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide) terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1.) Polyformyl diamines prepared by reacting formaldehyde with diols such as 1,4-butanediol and 1,5-pentanediol and subsequently aminating are useful. Especially preferred poly(alkylene ether) diamines are poly(propylene ether)diamine, poly(tetramethylene ether)diamine, and the poly(ethylene ether)glycols which are end-capped with poly(propylene ether) and/or propylene oxide and subsequently aminated.

In general, the polyoxyalkylene diamines useful in the practice of the present invention have an average molecular weight of from about 600 to about 12,000, preferably from about 900 to about 4,000.

The tricarboxylic acid (iii)(a)(2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3',4-diphenyl tricarboxylic anhydride, 3,3',5-benzophenone tricarboxylic anhydride, 1,3,4-cyclopentane tricarboxylic anhydride, 2,2',3-diphenyl tricarboxylic anhydride, diphenyl sulfone-3,3',4-tricarboxylic anhydride, ethylene tricarboxylic anhydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula:

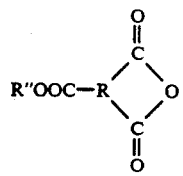

(II)

wherein:

R is a trivalent organic radical, preferably a $C_1$–$C_{20}$ aliphatic or cycloaliphatic, or $C_6$–$C_{20}$ aromatic trivalent radical;

R" is preferably hydrogen or a monovalent organic radical preferably selected for $C_1$–$C_6$ aliphatic and/or cycloaliphatic radicals and $C_6$–$C_{12}$ aromatic radicals, e.g., benzyl; most preferably hydrogen.

In the preparation of the instant polyetherimide ester polymers sufficient amounts of diol versus dicarboxylic acid, and tricarboxylic acid versus diamine must be present, as recognized in the art, to allow for substantially complete polymerization.

This type of one-pot reaction involving the reactions of (i) a diol component, (ii) a dicarboxylic acid component, (iii)(a)(1) a poly(oxy alkylene)diamine component, and (iii)(a)(2) a tricarboxylic acid component is described in U.S. Pat. No. 4,556,688 to McCready et al. incorporated herein by reference. In this type of one-pot reaction the amount of diol (i) employed will be, in general, a molar excess, preferably about 1.5 molar equivalents, based on the combined molar equivalents of dicarboxylic acid (ii) and of the total moles of the tricarboxylic acid (iii)(a)(2). The amount of the tricarboxylic acid employed will preferably be about two molar equivalents based on the number of moles of the poly(oxy alkylene)diamine. Obviously, less than two molar equivalents would result in incomplete imidization of the diamine resulting in potentially poorer properties. Conversely, greater than two molar equivalents of the tricarboxylic acid may lead to cross-linking and/or branching of the polymer. Generally, mole ratios of 2 moles tricarboxylic acid to 0.85 to 1.15 moles of poly(oxy alkylene)diamine yield useful polymers.

The amount by which the diamine (iii)(a)(1) and the dicarboxylic acid (ii) are used is generally not critical in forming the polyetherimide esters of the present invention. However, preferred amounts of the poly(oxy alkylene)diamine and dicarboxylic acid used are such that the weight ratio of the theoretical amount of the polyoxyalkylene diimide diacid, formable from the poly(oxyalkylene)diamine and the tricarboxylic acid, to the dicarboxylic acid is from about 0.002 to 2.0:1, preferably from about 0.01 to 2.0:1, and more preferably from about 0.25 to 2.0, and most preferably from about 0.4 to 1.4. The actual weight ratio will be dependent upon the specific poly(oxy alkylene)diamine and tricarboxylic acid used and more importantly upon the desired physical and chemical properties of the resultant polyetherimide ester. In general, the lower the ratio of the theoretical amount of polyoxyalkylene diimide diacid to dicarboxylic acid the better the strength, crystallization and heat distortion properties of the polymer. Alternatively, the higher the ratio, the better the flexibility, tensile set and low temperature impact characteristics.

The instant polyetherimide esters may also be prepared by a two-pot synthesis involving the reaction of the diol (i), the dicarboxylic acid (ii), and the polyoxyalkylene diimide diacid (iii)(b). Such a reaction is described in U.S. Pat. No. 4,556,705 to McCready, incorporated herein by reference. Basically, in this process the poly(oxy alkylene)diamine is reacted with the tricarboxylic acid to form a polyoxyalkylene diimide diacid, and the preformed polyoxyalkylene diimide diacid is then reacted with the diol and the dicarboxylic acid to form the polyetherimide ester polymers.

The polyoxyakylene diimide diacid (iii)(b) may be represented by the general formula:

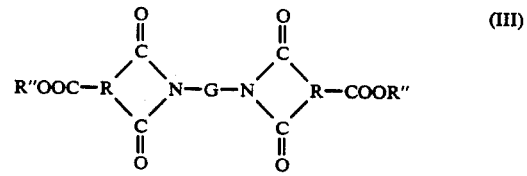

(III)

wherein G, R and R" are defined hereinafore.

The polyoxyalkylene diimide diacids of Formula III suitable for use herein are high molecular weight diimide diacids having an average molecular weight greater than about 700, preferably greater than about 900. They may be prepared by the imidization reaction of one or more tricarboxylic acids (iii)(a)(2) containing two vicinal carboxyl groups or an anhydride group and an additional carboxyl group which must be esterifiable with the high molecular weight poly(oxy alkylene)diamine (iii)(a)(1). These polyoxyalkylene diimide diacids and processes for their preparation are disclosed in U.S. Pat. No. 4,556,705, incorporated herein by reference. Briefly, these polyoxyalkylene diimide diacids may be prepared by known imidization processes including melt synthesis or by synthesizing in a solvent system. Such reactions generally occur at temperatures from about 100° C. to about 300° C., preferably at temperatures from about 150° C. to about 250° C., while drawing off water or in a solvent system at the reflux temperature of the solvent or azeotropic (solvent) mixture.

In this two-pot process, as in the one-pot process described hereinafore, it is generally preferred that the diol be present in at least a molar equivalent amount, preferably a molar excess, most preferably at least 150 mole % based on the moles of dicarboxylic acid and polyoxyalkylene diimide diacid combined. Such molar excess of diol generally allows for optimal yields, based on the amount of acids, while accounting for the loss of diol during esterification.

In this two-pot process the amount of polyoxyalkylene diimide diacid and the dicarboxylic acid utilized is generally not critical in forming the polyetherimide esters of the present invention. However, preferred amounts of the polyoxyalkylene diimide diacid and dicarboxylic acid used are such that the weight ratio of the polyoxyalkylene diimide diacid to the dicarboxylic acid is from about 0.002 to 2.0:1, preferably from about 0.01 to 2.0:1, more preferably from about 0.25 to 2.0:1, and most preferably from about 0.4 to 1.4:1.

It is also possible, as described in U.S. Pat. No. 4,556,688, to prepolymerize the aromatic dicarboxylic acid and the diol to form a prepolyester, and then react this prepolyester with either the diimide diacid or with the tricarboxylic acid and the poly(oxy alkylene)diamine. Forming the prepolyester can be achieved by conventional esterification techniques such as those described in U.S. Pat. Nos. 2,465,319 and 2,910,466, all of which are incorporated herein by reference.

In its preferred embodiment, the polyetherimide esters of the instant invention comprise the reaction products of dimethylterephthalate, optionally with up to 40 mole percent of another dicarboxylic acid or its ester forming derivative; butane diol, optionally with another diol such as butene diol; poly(oxyalkylene)diamine molecular weight of from about 600 to about 12,000, preferably from about 900 to about 4,000, and the trimellitic anhydride, or a polyoxyalkylene diimide diacid.

In the process of the present invention, particularly where all of the reactants are charged to the reactor together or where the polyoxyalkylene diimide diacid is preformed and excess tricarboxylic acid is present, a minor amount of the tricarboxylic acid or anhydride may react with available hydroxyl groups and ultimately function as a branching agent in the finished polymer. Within limits, the degree of branching in the finished polymer can be controlled by varying the mole ratio of tricarboxylic acid to poly(oxy alkylene)diamine. An excess of diamine reduces the degree of branching, while an excess of the tricarboxylic acid increases branching. In addition to controlling branching by varying the tricarboxylic acid/diamine mole ratio, one can compensate for branching by introducing a monofunctional reactant such as benzoic acid in minor amounts.

With reference to branching, it should be noted that polymers of this invention, when prepared from preformed diimide diacid, are substantially free of branching. If branching is desired, one needs only to introduce a branching agent, such as trimellitic anhydride, along with the preformed diimide diacid. The amount of branching agent will generally be less than about 0.15 moles per mole of diacid. Useful branching agents other than trimellitic anhydride include trimethyl trimellitate, glycerol, trimethylol propane, trimesic acid and its esters, and the like.

The instant polyetherimide esters may be prepared by conventional esterification/condensation reactions for the production of polyesters. These processes are described, inter alia, in U.S. Pat. Nos. 3,763,109; 3,651,014; 3,801,547; 4,556,705; and 4,556,688; all of which are incorporated herein by reference.

The polyetherimide esters of the instant invention contain at least the following two recurring structural units:

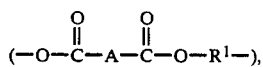

and

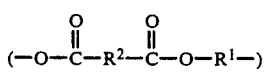

wherein:

A is the residue of the polyoxyalkylene diimide diacid absent the two carboxyl groups, i.e.,

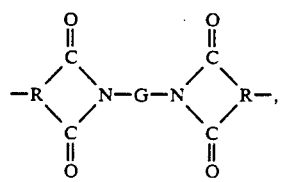

$R^1$ is the residue of the diol absent the two hydroxy groups, $R^2$ is the residue of the dicarboxylic acid absent the two carboxyl groups, and G is as defined hereinafore.

Additionally, while not required, it is customary and preferred to utilize a catalyst or catalyst system in the process for the production of the present polyetherimide esters. These types of catalysts are set forth in U.S. Pat. Nos. 4,556,705 and 4,566,688, both of which are incorporated herein by reference.

Both batch and continuous methods can be used for any stage of the ether imide ester polymer preparation. Polycondensation of the polyester prepolymer with the polyoxyalkylene diimide diacid can also be accomplished in the solid phase by heating finely divided solid polyester prepolymer with the diimide diacid in a vacuum or in a stream or inert gas to remove the liberated low molecular weight diol. This method has the advantage of reducing degradation because it must be used at temperatures below the softening point of the prepolymer.

The alkali metal salts of aliphatic polycarboxylic acids or mixtures thereof that are added to the copolyetherimide ester resin contain at least 20 carbon atoms, preferably from 26-54 carbon atoms, and have a molecular weight of between 300 and 1500, preferably from about 450-1000. The polycarboxylic acids used to prepare the salts must contain at least 2 carboxyl groups per molecule, preferably 2 to 4 carboxyl groups. It is believed that alkali metal salts of polycarboxylic acids containing less than 20 carbon atoms may be unsatisfactory because they may have little effect on melt strength. Salts of polycarboxylic acids having molecular weights in excess of about 1500 can exhibit phase separation leading to delamination after high shear processing. Although both saturated and unsaturated polycarboxylic acids can be used to form the salt, acids substantially free of unsaturation are preferred because they have less tendency to discolor. The concentration of salt of aliphatic polycarboxylic acid that is added to modify the copolyester is from about 0.1% to 10% by weight, preferably 0.5% to 5% by weight, based on the copolyetherimide ester. Below about 0.1% the effects of the salt are not significant; above about 10% the physical properties of the copolyetherimide ester resin are adversely affected. Although any alkali metal can be used to form the salt, the preferred salts of the polycarboxylic acid are sodium and potassium salts, with sodium being especially preferred because of its lower atomic weight and its effectiveness in the present compositions.

Representative aliphatic polycarboxylic acids that can be used in this invention include octadecylsuccinic acid, octadecenylsuccinic acid, decosane dicarboxylic acid, dimer acid, and trimer acid, or mixtures thereof. By dimer acid is meant the $C_{36}$ dicarboxylic acid which is obtained by the dimerization of unsaturated $C_{18}$ fatty acids. By trimer acid is meant the $C_{54}$ tricarboxylic acid which is obtained by the trimerization of $C_{18}$ fatty acids. Any ethylenic unsaturation present in the dimer and trimer acids can be removed by hydrogenation. As previously indicated, saturated polycarboxylic acids are preferred. Both dimer and trimer acids containing unsaturation or saturated by hydrogenation are readily available in commercial quantities. Availability coupled with effectiveness accounts for a preference for dimer and trimer acids and, particularly, for dimer acid. The commercial grades of dimer acid normally contain at least minor amounts of starting monocarboxylic acid and higher polymers, principally trimer acid. Likewise, commercial trimer acid normally contains traces of monocarboxylic acid and larger amounts of dimer acid. Obviously, mixtures of dimer and trimer acids can be used. It should be noted that other unsaturated monocarboxylic acids containing from 16–26 carbon atoms can also be dimerized or trimerized to form polycarboxylic acids which are useful in the present invention. These materials (with the exception noted above for acids derived from $C_{18}$ monocarboxylic acids) are generally not commercially available but are highly effective in the present invention.

The salts of the polycarboxylic acid are readily prepared by adding a concentrated aqueous solution of the selected alkali metal hydroxide to a solution of the acid in an alcohol, such as methanol, and isolating the resulting salt of the acid by evaporation of alcohol and water. Preferably, equivalent amounts of hydroxide and acid are used. Excess hydroxide should be avoided.

Melt strength of the copolyetherimide ester composition can be further enhanced by the incorporation of a multifunctional epoxide in addition to the salts of aliphatic polycarboxylic acid. Applicant has discovered that a substantial synergistic increase in melt viscosity can be achieved by the combined incorporation of multifunctional epoxides and salts of aliphatic polycarboxylic acid in the composition of the present invention.

The multifunctional epoxides have an average epoxy functionality of greater than 2 epoxy groups per epoxide molecule, and more preferably an average epoxy functionality of at least 3 epoxy groups per epoxide molecule. A preferred multifunctional epoxide is obtained by reacting orthocresol novolac with epichlorohydrin and can be represented by the general formula:

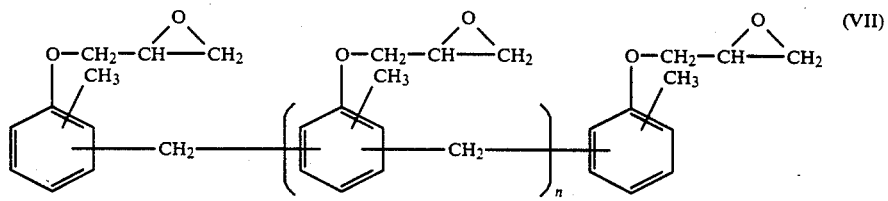

wherein n is greater than 0, preferably greater than 2, and most preferably about 3.4. Another preferred multifunctional epoxide is triglycidyl isocyanurate.

The present compositions can be prepared by blending alkali metal salt of the polycarboxylic acid (and optionally the multifunctional epoxide) with the molten copolyetherimide ester elastomer in high shear mixing equipment such as a screw-type extruder or a Banbury mixer. The temperatures employed will normally be about 20° C. above the melting point of the copolyetherimide ester.

It is important to the blow molding properties of the composition containing salts of aliphatic polycarboxylic acid that there is sufficient mixing in the extrusion of the resin melt.

Compounding can be carried out in conventional equipment. For example, after pre-drying the thermoplastic copolyetherimide ester resin, e.g., at 125° C. for 4 hours, a single screw extruder is fed with a dry blend of the copolyetherimide ester and the additive ingredients, the screw employed having a long transition and metering section to insure melting. On the other hand, a thin screw extrusion machine, e.g., a 30 mm Werner Pfleiderer machine can be fed with resin and additives at the feed port. If a multifunctional epoxide is included in the composition, dispersion is facilitated by addition of the epoxide as a pre-extruded concentrate in copolyetherimide ester resin. In either case, a generally suitable machine temperature will be about 400° F. to 570° F.

The compounded composition can be extruded and cut up into molding components such as conventional granules, pellets, etc., by standard techniques.

It is to be understood that the foregoing compositions may contain other additives known in the art, including, but without limitation, nucleating agents, mold release agents, fillers, flow promoters, coloring agents, coupling agents, and stabilizers. The compositions may also further contain amounts of thermoplastic polyesters such as polyethyleneterephthalate and polybutylenetere-phthalate. One may readily determine which are necessary and suitable for a particular application. Preferably as a blow molding composition the composition is free of reinforcing fibers.

DESCRIPTION OF THE PREFERRED EMBODIMENTS

The following examples illustrate the invention. The claims are not to be construed to be limited by them in any manner whatsoever.

In the examples the following designations are used to denote the materials and physical tests employed:

Physical Tests

MV=Melt Viscosity (poise) - modified ASTM D1238.
LA=A polyetherimide ester is prepared from 27 parts butanediol, 34 parts dimethylterephthalate, and 39 parts of the diimide diacid of trimellitic anhydride and polypropylene ether diamine of average molecular weight 2000. The preparation is as described in U.S. Pat. No. 4,556,705.
LB=A polyetherimide ester is prepared from 32 parts butanediol, 40 parts dimethylterephthalate, and 28 parts of the diimide diacid of trimellitic anhydride and polypropylene ether diamine of average molecular weight 2000. The preparation is as described in U.S. Pat. No. 4,556,705.
SA=Disodium salt of dimer acid prepared from 896.3 grams Empol 1010 $C_{36}$ dimer acid (from Emery Industries) and 262.4 grams of a 50% sodium hydroxide solution.
IM=Butyl acrylate impact modifier available from Rohm & Haas as EXL 3330.
HP=Hindered phenol stabilizer Irganox 1010 available from Ciba Geigy.
EA=Multifunctional epoxide known as an epoxy cresol novolac represented by the formula:

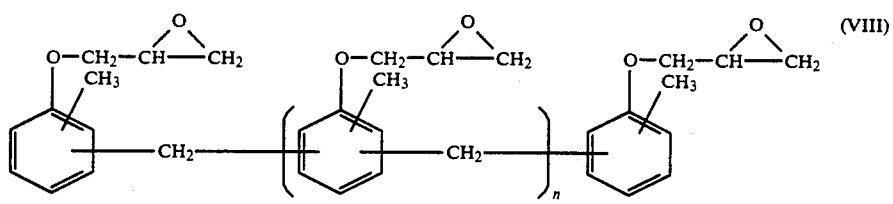

wherein n has an average value of 3.4.

In Table 2, Examples E7 to E14 and C15 and C16 the EA is incorporated into the composition by first preparing an EA concentrate which is prepared by extruding 7.8 weight parts of EA (ECN 1299 available from Ciba Geigy), 0.2 weight parts hindered phenol (Irganox 1076 available from Ciba Geigy), and 92 weight parts LB.

EXAMPLES

The following examples illustrate the present invention but are not meant to limit the scope thereof. The examples prefaced by E are examples illustrative of the present invention. Examples prefaced by C are comparative examples.

TABLE 1

| Ingredient | C1 | E2 | E3 |
|---|---|---|---|
| LA | 99.8 | 97.8 | 95.8 |
| SA | — | 2 | 4 |
| EA | — | — | — |
| HP1 | .2 | .2 | .2 |
| Sodium Stearate | — | — | — |
| MV (@ 230° C.) Poise | 2,900 | 8,100 | 17,000 |

Note that a comparison of E2/E3 versus C1 illustrates SA improves melt viscosity of the composition.

TABLE 2

| Ingredient | E4 | E5 | E6 | E7 | E8 | E9 | E10 | E11 |
|---|---|---|---|---|---|---|---|---|
| LB | 98.8 | 96.8 | 93.8 | 88.8 | 83.8 | 78.8 | 95.8 | 92.8 |
| SA | 1 | 1 | 1 | 1 | 1 | 1 | 2 | 2 |
| EA Concentrate | — | 2 | 5 | 10 | 15 | 20 | 2 | 5 |
| HP1 | .2 | .2 | .2 | .2 | .2 | .2 | .2 | .2 |
| MV (240° C.) | 3,100 | 7,400 | 132,000 | >180,000 | >180,000 | >180,000 | 12,700 | 180,000 |

TABLE 3

| Ingredient | E12 | C13 | C14 |
|---|---|---|---|
| LA | 92.8 | 94.8 | 89.8 |
| SA | 2 | — | — |
| EA Concentrate | 5 | 5 | 10 |
| HP1 | .2 | .2 | .2 |
| MV (230° C.) | 132,000 | 3,400 | 9,000 |

TABLE 4

| Ingredient | C15 | E16 | E17 | E18 |
|---|---|---|---|---|
| LB | 84.8 | 83.3 | 82.6 | 81.6 |
| SA | — | 1.5 | 2.2 | 3.0 |
| EA Concentrate | — | — | — | — |
| HP1 | .2 | .2 | .2 | .2 |
| IM | 15 | 15 | 15 | 15 |
| MV (240° C.) | 3,900 | 8,500 | 17,000 | 28,000 |

Note that E16 to E18 illustrate the effectiveness of SA to increase melt viscosity of compositions further containing impact modifier.

TABLE 5

| Ingredient | C19 | C20 | C21 |
|---|---|---|---|
| LA | 99.3 | 98.8 | 95.8 |
| SA | — | — | — |
| EA Concentrate | — | — | — |
| HP1 | .2 | .2 | .2 |
| Sodium Stearate | .5 | 1.0 | 4.0 |
| MV (230° C. | 2,900 | 3,400 | 3,000 |

Note that C19 to C21 illustrates that the substantial effect of increased melt viscosity is not common to all sodium carboxylates (compare with C1, E2 and E3).

What is claimed is:

1. A thermoplastic resin composition comprising:
   (a) a polyetherimide ester resin; and
   (b) a melt viscosity increasing amount of an alkali metal salt of an aliphatic polycarboxylic acid having at least 20 carbon atoms.

2. The composition of claim 1 wherein said salt of the aliphatic polycarboxylic acid has a molecular weight from between 300 and 1500.

3. The composition of claim 2 wherein the polycarboxylic acid is derived from a dimer acid.

4. The composition of claim 3 wherein said salt of the aliphatic polycarboxylic acid is derived from sodium.

5. The composition of claim 1 wherein said polyetherimide ester resin is derived from a diol, a dicarboxylic acid, and a polyoxyalkylene diimide diacid having a molecular weight greater than 700.

6. The composition of claim 1 wherein said polyetherimide ester resin is derived from a diol, a dicarboxylic acid, a (polyoxyalkylene) diamine having a molecular weight of from about 600 to about 12,000, and a tricarboxylic acid.

* * * * *